United States Patent [19]
Genin

[11] 4,016,411
[45] Apr. 5, 1977

[54] MINI ELECTRONIC CALCULATOR WITH BLACKBOARD DISPLAY FORMAT

[75] Inventor: Robert Genin, Bay Harbor Islands, Fla.

[73] Assignee: Jardine Industries, Inc., Hong Kong, Hong Kong

[22] Filed: Jan. 29, 1976

[21] Appl. No.: 653,606

[52] U.S. Cl. ................................... 235/156; 35/6; 35/31 R
[51] Int. Cl.² .................. G09B 19/02; G06F 15/02
[58] Field of Search ................ 235/152, 156; 35/6, 35/31 R, 31 C; 340/325, 366 R, 379

[56] References Cited
UNITED STATES PATENTS

| | | | |
|---|---|---|---|
| 3,699,667 | 10/1972 | Gomez | 35/31 C X |
| 3,787,988 | 1/1974 | Nakajima et al. | 235/156 X |
| 3,854,226 | 12/1974 | Divine et al. | 35/31 C |
| 3,863,060 | 1/1975 | Rode et al. | 235/156 |
| 3,925,909 | 12/1975 | Duncan | 35/31 R X |

*Primary Examiner*—Jerry Smith

[57] ABSTRACT

A mini electronic calculator adapted to assist children in acquiring the rudiments of arithmetic. The keyboard of the calculator is provided with three parallel sets of keys, the upper set being a row of digit keys for entering a first complete number, and the middle set being a corresponding row of digit keys for entering a second complete number. The lower set includes plus and minus sign function keys and an equal sign key. The calculator display is in a blackboard format and has three parallel groups of LED display stations, the upper group of which is formed by a row of digit stations for presenting the first complete number entered by actuating the keys in the upper keyboard set. The second group is formed by a lead station for presenting a plus or minus sign, depending on which function key is actuted, followed by a row of digit stations for presenting the second complete number entered by actuating the keys in the middle set. The third group is separated on the blackboard display from the second group by a permanent summation line and is formed by a lead station for presenting the equal sign, followed by a row of digit stations for presenting the result of the computation.

8 Claims, 3 Drawing Figures

Display Format

MINI ELECTRONIC CALCULATOR WITH BLACKBOARD DISPLAY FORMAT

BACKGROUND OF INVENTION

This invention relates generally to electronic mini-calculators, and more particularly to a hand-held or desk calculator adapted to assist children in acquiring the rudiments of arithmetic, the calculator being capable of performing addition and subtraction of positive integers and of visually displaying computations carried out by the student in a blackboard format.

The value of mini-calculators as a teaching aid is no longer in serious dispute. Thus the National Council of Teachers of Mathematics recently urged teachers to "recognize the potential contribution of the calculator as a valuable instructional aid." This advice is included in a policy statement issued by the National Council to accompany an article on the use of electronic calculators published in the January 1976 issue of The Arithmetic Teacher as well as in The Mathematics Teacher, magazines for elementary and secondary school teachers.

But there are sharp differences of opinion among educators regarding the age level at which the use of electronic calculators should be encouraged. According to the "About Education" column in the Dec. 24, 1975 issue of The New York Times, Dr. E. G. Gibb, President of the National Council, is wary of bringing in the mini-calculator before the fourth grade, for he feels that "the calculator should not be used until the youngster has an understanding of what the calculator is doing for him."

George Grossman, who heads the Mathematics Bureau of the New York City School System, also feels that electronic calculators can be especially valuable in kindling interest in mathematics. Yet, according to the same New York Times column, he suggests that its use not be introduced until the seventh grade.

Thus while teachers of elementary mathematics now appreciate the fact that electronic calculators reinforce the learning of basic numbers and serve to verify the results of pencil and paper computations, they are nevertheless fearful of introducing the calculator at too early an age. Presumably, the beginning student is expected to learn arithmetic by way of the traditional blackboard or pencil and paper technique and should be denied access to calculators in the early phases of instruction.

The apparent contradiction between the recognized value of the electronic calculator as a useful teaching tool and the withholding of this tool until the student has been subjected to several years of traditional instruction is not to be imputed to the resistance of teachers to innovation, but rather to the limitations of existing types of calculators.

To illustrate these limitations, we shall, by way of example, assume that a student is called upon by his teacher to add the numbers 24 and 19 at the blackboard. The student will set up the problem and give the result in the following classic manner:

```
    24
  + 19
  = 43
```

If now this student is asked to carry out the same computation by means of a standard mini-calculator to verify his result, he will first manipulate the keyboard digits to enter the number 24 which will be displayed on the read out. This read-out usually is in the form of a row of light-emitting diode stations. Before entering the next number, the student will press the + function key, but this operation is not indicated on the display which continues to exhibit number 24. Then he will key in the number 19 which will be displayed in place of 24. To obtain the result, the student thereafter presses the = function key, causing erasure of number 19 and the display of the result 43, thereby verifying the blackboard computation.

A standard mini-calculator which behaves in this fashion is useful to the student who has already acquired a fair degree of proficiency in arithmetic, for he understands that the calculator is carrying out within its internal system the same computation performed on the blackboard, even though this fact is not visible on the display. But for a beginner who is, say, no more than 5 years old and who has yet to grasp the simple concepts underlying arithmetic, the behavior of the conventional calculator is altogether mystifying, in that it fails to display the various numbers being manipulated and the nature of the manipulation, but merely exhibits, at any one time, a single number. As a consequence, educators, while appreciative of the value of mini-calculators for more advanced students, have advised against their use by beginners.

But the fact remains that the first steps in any educational process, whether in reading, writing or arithmetic, are the most crucial, in that these steps psychologically condition the student's attitude toward the subject. If, in his earliest experience with a given subject, a young student is frustrated or blocked in his ability to grasp fundamental principles, this may prejudice his attitude toward the subject and impair his ability to acquire proficiency therein.

It is for this reason that so much attention is now being paid by parents and educators to the kindergarten or pre-school years, for if play and learning can be so intermingled as to implant basic information or skills in the course of participating in a game or carrying out some form of enjoyable activity, this can provide an invaluable introduction to a given subject. While existing types of mini-calculators have value in motivating a student of arithmetic and in reinforcing learning, their limitations are such as to preclude their use in the pre-school years where the need for a playful instructional aid is greatest.

SUMMARY OF INVENTION

In view of the foregoing, the main object of this invention is to provide an electronic mini-calculator adapted to initiate young children in the rudiments of arithmetic, the calculator display being in a blackboard format whereby the electronic presentation of a simple arithmetic computation is fully compatible with its traditional presentation.

A significant advantage of a mini-calculator in accordance with the invention is that it makes it possible for young children, on their first exposure to arithmetic concepts, to work out a problem with pencil and paper and to then immediately verify the correctness of the calculation without the assistance of a fellow student or teacher. Since the calculator display is in a blackboard format, it not only checks the validity of the final result, but also the correctness of the calculating process.

Moreover, because the use of a mini-calculator involves the manipulation of keys, and the depression of a key bearing a given digit or symbol results in an illuminated display of the same digit or symbol, this operation has a playful aspect which is enjoyable to the young student and serves to sustain his interest.

It must also be borne in mind that the modern industrial age is characterized not only by its expanding body of knowledge and data, but also by keyboard-operated machines that have been developed to analyze, process and communicate this information. The mini-calculator, quite apart from its value in teaching arithmetic principles, serves to initiate a child in the use of a keyboard. The skill the child acquires in the use of the mini-calculator is also applicable to the operation of the keyboard of a touch-tone telephone set or other keyboard-operated devices in common use.

More specifically, it is an object of this invention to provide a mini-calculator capable of performing addition and subtraction of positive integers with non-negative results, the numbers being added or subtracted and the result of the computation being displayed in a blackboard format.

Briefly stated, these objects are attained in a mini-calculator whose display panel is provided with three parallel groups of display stations, the first group consisting of digits for displaying the first operand, the second group consisting of a + or − sign station followed by digits for displaying the second operand and the third group consisting of an = sign station followed by digits for displaying the result. A line is permanently drawn on the display panel between the second and third groups to separate the results from the operands.

The keyboard associated with the display is constituted by three parallel sets of keys. The row of keys in the first set are marked with the digits 0 to 9 for entering the first operand, the row of keys in the second set are likewise marked with the digits 0 to 9 for entering the second operand, while the keys in the third set include + and − function keys, an equal sign (=) key and a clear or erase key (θ). Thus one set of keys is reserved for the first operand and another set for the second operand, the display exhibiting both operands simultaneously as well as the nature of the computation (addition or subtraction) and the result thereof in a format identical to the traditional blackboard format.

OUTLINE OF DRAWINGS

For a better understanding of the invention as well as other objects and further features thereof, reference is made to the following detailed description to be read in conjunction with the accompanying drawings, wherein.

DESCRIPTION OF INVENTION

Figure 1:
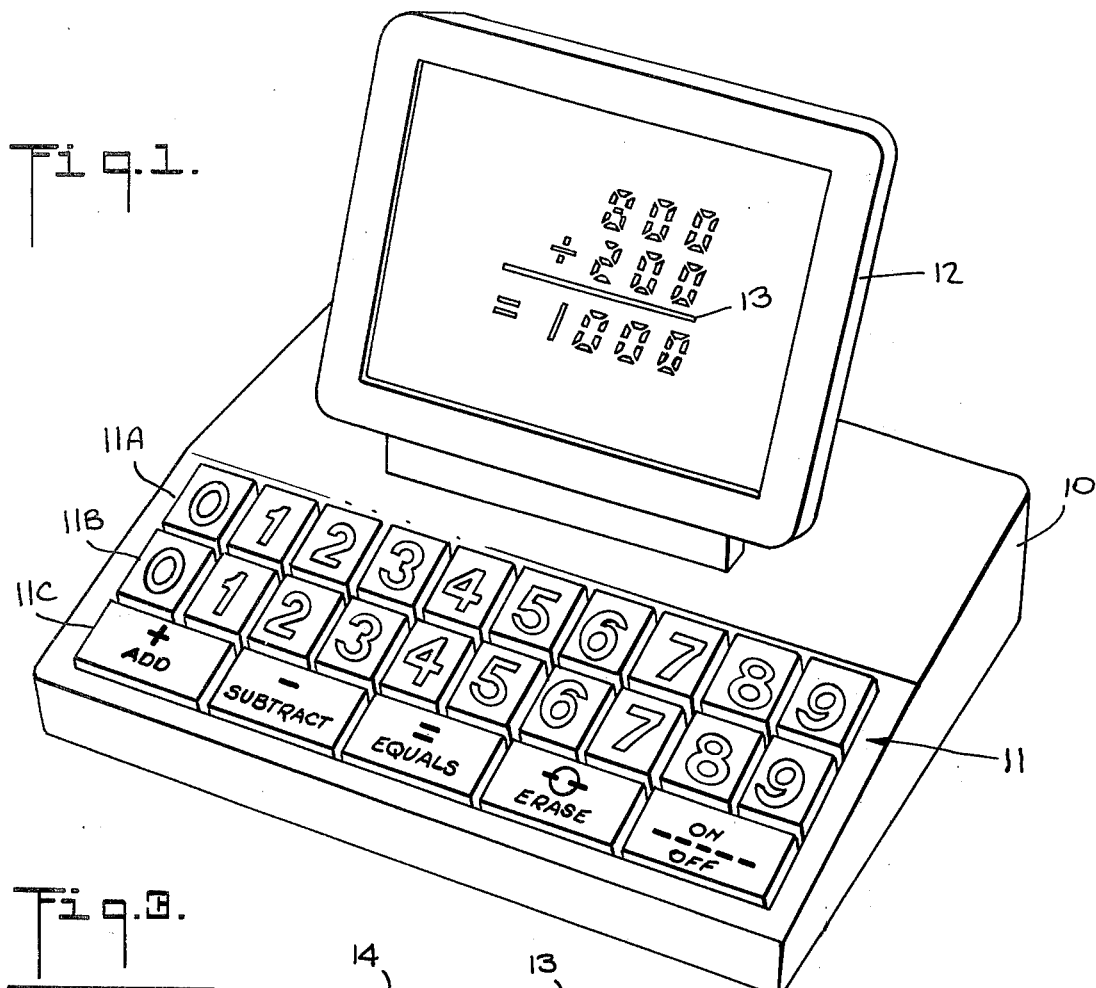
FIG. 1 is a perspective view of a preferred embodiment of a mini-calculator in accordance with the invention.

Since a mini-calculator in accordance with the invention makes use of LED display elements and associated integrated circuits similar to those commonly found in standard mini-calculators, such as pocket calculators manufactured and sold by the Hewlett-Packard Company of Palo Alto, Calif., there is no need in the present specification to spell out the details of these display elements and circuits. In this regard, reference is made to the 1975 Rode et al. U.S. Pat. No. 3,863,060, assigned to Hewlett Packard, which discloses a general purpose calculator employing integrated circuits to perform arithmetic and other operations which are presented on a single line LED display.

Electronic calculators of the type currently in widespread use are ordinarily provided with storage means having registers for storing numeric data entered therein by an operator via a keyboard. With numeric data present in one or more of the registers, various arithmetic operations may be performed, such as addition, subtraction, multiplication and division, by actuating a function key corresponding to the desired operation. After the calculator has carried out a specific function, the result is displayed to the operator.

In a conventional mini-calculator, the keyboard is provided with a single set of digit keys marked 1 to 9 and a single group of LED display stations for presenting a single complete number at any one time. The entry of a complete number or operand is effected by successive actuation of the appropriate digit keys, beginning with the most significant digit and ending with the least significant digit. Thus to enter the complete number 216 in the calculator, the operator first presses the 2 key, then the 1 key and finally the 6 key, 2 being the most significant digit, and 6 the least significant.

In the typical calculator arrangement, as each successive key is actuated, a representation of the digit corresponding to the actuated key is automatically entered into the storage section of the calculator in a location usually specified as the entry register. After the last digit key has been actuated, a function key on the keyboard (i.e., a minus, plus or multiply key) must then be actuated to indicate to the calculator that all of the digits of the complete number have been entered.

Actuation of the function key conditions the calculator circuitry for the entry of additional numeric data by the same set of digit keys on the keyboard, in such a manner as to prevent commingling of the digits of the data to be entered with the digits already entered. This is normally accomplished internally by shifting the digits of the already entered numbers from the entry register of the storage system to a second register.

In operating a conventional mini-calculator to add two complete numbers, one first actuates the digit keys in the single set thereof on the keyboard in order to enter the first complete number. As the digits of the first complete number are successively entered, these digits are presented by the LED stations on the single line display. This is followed by actuation of the + function key, after which the operator successively actuates the digit keys in the same single keyboard set to enter the second complete number.

When the operator presses the + function key, this action is not indicated on the display which continues to show the first complete number. However, when the most significant digit of the second complete number is entered, the display of first complete number is erased and this digit is presented. To obtain the result of this addition, the operator then actuates the equal sign (=) key, at which point the second complete number on the display is replaced by the result, but the equal sign is not displayed.

As distinguished from conventional mini-calculators, a calculator according to the present invention includes a keyboard having two parallel sets of digit keys, one set for entering the first complete number, and the second set for entering the second complete number to be added or subtracted from the first. The display associated with this keyboard is in a three-line blackboard format and serves to display both the first and second complete numbers entered into the calculator as well as the selected function, the computation result being shown below the first and second complete numbers.

The embodiment of the invention disclosed herein is designed for use by pre-school children or children in the 3- to 6-year-old age bracket who are first being exposed to arithmetic concepts. Hence the calculator is restricted to the addition and subtraction of positive integers with non-negative results. This calculator serves to assist the child in coping with simple sums, for these must be mastered before the child is introduced to the more difficult concepts involved in multiplication and division.

In this embodiment, the maximum number of digits in each complete number to be added or subtracted is three. Hence to display the result, no more than four digits are required. It is to be understood, however, that the invention lends itself to more complex arrangements such as a blackboard format and an associated keyboard adapted to solve multiplication and division problems as well as addition and subtraction.

Referring now to FIG. 1, there is shown a preferred embodiment of a desk-type mini-calculator in accordance with the invention, the calculator including a case 10 within which is housed the electronic integrated circuits of an arithmetic computation unit into which data is entered by a keyboard 11.

Mounted above case 10 is a three-line display panel 12 which is in a framed blackboard format. Also housed in the case are two batteries, one for powering the circuits and the other the LED display. It will be appreciated that the calculator may also be made in hand-held form, with the display panel flush with the top wall of the case, rather than raised thereabove, as shown.

Keyboard 11 is provided with three parallel sets of keys. The first or upper set 11A is formed by a row of ten digit keys marked with the symbols 0 to 9. The second or middle set 11B is formed by a corresponding row of 10 digit keys 0 to 9. The third or lower set 11C is formed by a row of five keys each having a width equal to a pair of digit keys. The first key in the third set is a + sign function key (ADD), the second is a − sign function key (SUBTRACT), the third an = sign key (EQUALS), the fourth an θ sign clearance key (ERASE), and the fifth an ON/OFF power switching key.

The first set of digit keys 11A are used by the child to enter the first complete number or operand, such as 800 shown on the first line of display 12. As the keys marked 8, 0 and 0 are actuated in succession, these numbers immediately appear in the first line of the display which is formed by a group of three LED stations. The second set of keys 11B are used by the child to enter the second complete number or operand, such as 200 shown on the second line of the display. Because a distinct set of digit keys is reserved for the second operand, the child is not confused by the keyboard; for the physical separation of the upper and middle set of digit keys for entering the first and second operands is analogous to the physical separation which exists in presenting these operands on paper or on a blackboard.

But before the second operand is entered, the child must press the appropriate + or − function key to instruct the calculator regarding the function to be performed. The function specified is displayed by a separate LED station on the second line of the display, a + function being shown in FIG. 1.

A summation line 13 is permanently drawn on the display panel between the LED stations in the second group thereof for presenting the second operand and the third group for presenting the result which in this example is 1000. To command the calculator to perform the specified function, the = sign key is actuated, this sign being presented in advance of the result on the third line of the display. Thus each calculation is shown in a blackboard format, and the child, because of this format, is able to appreciate the manner in which a simple arithmetic computation is carried out.

The clear or erase key θ in the third keyboard set, when actuated, erases the entered information and prepares the calculator for the next computation. The electronic arrangement is such that when the ON/OFF key is pressed to turn on the power for the calculator, the calculator automatically resets itself to the cleared state, as if the erase key had been actuated.

Data is entered into the keyboard in the following sequence, assuming that the calculator has first been cleared.

A. The first operand is entered by actuating the digit keys in the first set 11A, the most significant digit being entered first and the least significant digit last. The operand is presented on the first line of the display 12.

B. The operation to be performed is then specified by actuating the + or − function key, the selected symbol being shown on the display.

C. The second operand is entered by actuating the digit keys in the second set 11B, the most significant digit being entered first and the least significant digit last, this operand being shown on the second line of the display.

D. The equal sign is then entered by actuating the = sign key, this sign and the result being displayed on the third line of the display.

Figure 2:
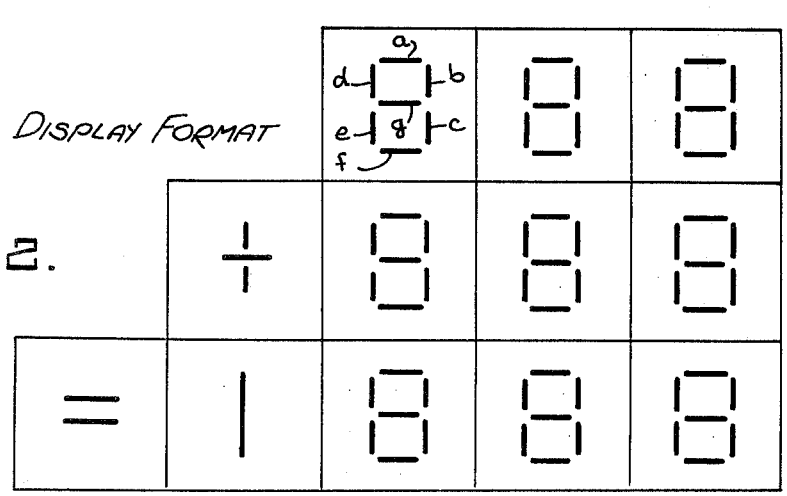
FIG. 2 shows the display format.

The display, as shown separately in FIG. 2, is formed by three parallel groups of LED display stations 12A, 12B and 12C. The upper group 12A is formed by a row of three seven-segment LED digit stations for displaying the first operand. By selective excitation of these seven segments, one can form any one of the digits 0 to 9. Thus when all seven segments are excited, the numeral 8 is presented, whereas when all segments except for the middle horizontal segment are actuated, the numeral presented is 0.

The middle group 12B is formed by a row of four LED stations, the lead station being a selectively-actuatable cruciform symbol which displays a minus sign when only the horizontal and vertical segments are excited. This is followed by three-seven-segment LED digit stations to display the second operand which correspond in position to the digit station in the upper group.

The lower group 12C serves to present the result and is formed by a row of five stations, the lead station having two parallel horizontal segments to present an = sign, the next station being a vertical segment to indicate the number 1. The following three stations in lower group 12C are seven segment digit stations which correspond in position to the digit stations in the group above.

Since the largest three-digit first operand is 999, and the largest three-digit second operand is also 999, the addition of these complete numbers results in 1998; hence there is no need to present a four digit result whose most significant number is greater than 1.

Figure 3:
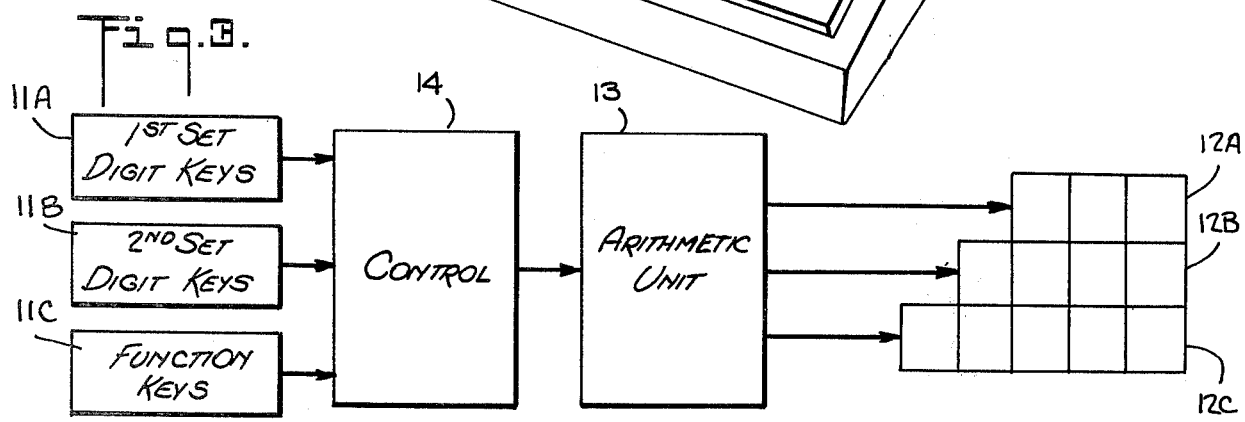
FIG. 3 is a simplified block diagram of the electronic system of the calculator.

The circuit arrangement, as shown schematically, in FIG. 3 is constituted by an integrated circuit arithmetic unit 13 in chip form into which entries are made through a control circuit 14 by operating the keyboard 11 whose upper set 11A of digit keys are used to enter a first operand which is displayed on the upper group 12A of LED stations. The middle set 11B of digit keys serves to enter the second operand which is displayed on the middle group 12B of LED stations. The lower set 11C of keys include a function key whose symbol is presented in advance of the second operand, and a = key, whose symbol is presented in advance of the result appearing in the lower group 12C of stations.

The integrated circuit is arranged to avoid operating on and displaying mistakes made by the child, for the chip rejects all invalid entries and acts as if such entries had not been entered. The following keyboard entries are treated as invalid and are effectively disregarded by the calculator.

A. After a valid = sign is encountered to produce a result, any further entry except for a clear $\theta$ entry is regarded as invalid. Thus once the result appears on the display, it can only be erased to clear the system in preparation for the next calculation.

B. Immediately after a clear $\theta$ entry which erases the display, the entry of a 0 digit by actuating this key in the upper set 11A is invalid, for the operator is not permitted to use a zero as the most significant digit in the first operand.

C. After the first three digits in the first operand have been successively entered by actuating keys in upper set 11A, any further entry is invalid, for the calculator accepts only operands having a three-digit maximum.

D. After a valid entry of a + or − function and before a clear $\theta$ entry, all entries made by actuation of the keys in the upper set 11A are invalid, for once a function is specified, the first operand cannot be altered.

E. The entry of a + or − function by operation of a function key in lower set 11C is invalid if made before the keys in the upper set 11A are operated, for the function cannot be entered before the first operand is presented.

F. After a valid entry of a + or −, an 0 digit entry by operating this key in the middle set 11B is invalid, for the operator is not permitted to use a zero as the most significant digit in the second operand.

G. After three digits are entered in succession by the keys in the middle set 11B, all further entries are invalid, for the second operand has a three-digit maximum.

H. Before a valid entry of a + or − function, all entries by actuation of the keys in the middle set 11B are invalid, for the function must be specified in advance of the second operand.

I. Before the valid entry of digits by actuation of keys in the middle set 11B, the entry of an = sign is invalid, for the second operand must be entered before a result is produced.

J. The simultaneous actuation of two or more keys is invalid, and the calculator then acts as if no entry has been made.

The display is blanked either after power is turned on by operation of the ON/OFF key, or by actuating the erase $\theta$ key. Keyboard entries, if valid, are displayed as they are entered. The = sign and the result are displayed after valid entries are made, but only if the result is non-negative. Thus if the child enters 150 as the first operand and specifies a − function before entering, say 200 as the second operand, when he thereafter presses the = key, no result will be displayed.

Thus the mini-calculator, however badly operated by a child, is foolproof and is incapable of presenting an arithmetic problem and an answer thereto in a blackboard format which is either misleading or beyond the comprehension of the child. The only problems which can be presented are those in which the first and second operands have no more than three digits and in which the result of addition or subtraction is positive and is limited to four digits. These limitations represent, as it were, the strict boundaries of a course in the rudiments of arithmetic, and make it possible for a child to first carry out a simple computation by pencil and paper or on a blackboard, and to quickly verify his computation with the mini-calculator in a blackboard format which matches his computation if it is correct.

While there has been shown and described a preferred embodiment of a mini electronic calculator with a blackboard display format in accordance with the invention, it will be appreciated that many changes and modifications may be made therein without, however, departing from the essential spirit thereof. For example, the set of keys, instead of being in parallel horizontal rows, as shown, may be arranged in parallel vertical rows. Also, instead of using LED display stations, other electro-optic stations may be used for the same purpose, such as liquid-crystal display elements. Also, instead of presenting the equal sign when this key is actuated, the equal sign may be permanently marked on the display below the summation line.

I claim:

1. A mini electronic calculator for adding or subtracting two complete numbers comprising:

A. an integrated circuit arithmetic unit having means to carry out addition and subtraction of two complete numbers entered therein;

B. a keyboard associated with the input of the unit, said keyboard having three parallel sets of keys arranged along horizontal lines, the keys of the first set being constituted by a row of digit keys marked with the digits 0 to 9 for entering the first complete number, the keys of the second set being constituted by a corresponding row of digit keys for entering the second complete number, and the keys of the third set including a plus function key, a minus function key, an equal sign key and an erase key, said erase key being coupled to the unit to clear the display in preparation for a fresh computation; and C. an electro-optic display associated with the output of the unit, said display having three parallel groups of stations arranged along horizontal lines, the stations in the first group being digit stations for presenting the first complete number entered by successive actuation of keys in the first set, the stations in the second group being constituted by a lead station for presenting the function entered by actuating the plus or minus key, followed by digit stations for presenting the second complete number entered by successive actuation of keys in the second set, the third group being constituted by digit stations for presenting the result, whereby the display exhibits the first and second complete numbers and the result of a computation in a blackboard format, said first and second display groups each having three digit stations at corresponding locations to limit the complete numbers to three digits, the third group having four digit stations to provide the result, said arithmetic unit including means to disregard entries after three digits have been successively entered in the first group of digit stations and to disregard entries after three digits have been successively entered in the second group of digit stations.

2. A calculator as set forth in claim 1, wherein said arithmetic unit is housed in a desk type case and said display is constituted by a raised panel mounted above said case.

3. A calculator as set forth in claim 1, wherein said calculator is battery-operated and said third set of keys also includes a switching key to turn on the power, the circuit being arranged to clear the display when this key turns on power.

4. A calculator as set forth in claim 1, further including means in said unit to disregard entries giving a negative result.

5. A calculator as set forth in claim 1, further including means in said unit to disregard entries made by said second set unless a function key is first actuated.

6. A calculator as set forth in claim 1, further including a summation line permanently marked in the display between the second and third groups.

7. A calculator as set forth in claim 1, wherein said third group of stations includes a lead station for presenting the equal sign in advance of the result.

8. A calculator as set forth in claim 1, wherein said electro-optic stations are formed by light emitting diodes.

* * * * *